(12) United States Patent
Chen

(10) Patent No.: US 7,345,714 B2
(45) Date of Patent: Mar. 18, 2008

(54) VIDEO SIGNAL CLAMP

(75) Inventor: Dongwei Chen, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 434 days.

(21) Appl. No.: 10/905,634

(22) Filed: Jan. 13, 2005

(65) Prior Publication Data

US 2006/0152633 A1    Jul. 13, 2006

(51) Int. Cl.
   *H04N 5/08* (2006.01)
   *H04N 5/18* (2006.01)
   *H04N 9/72* (2006.01)
   *H03L 7/00* (2006.01)

(52) U.S. Cl. ............. 348/692; 348/525; 348/540; 348/697

(58) Field of Classification Search ......... 348/691, 348/694–697, 525, 540
   See application file for complete search history.

(56) References Cited

U.S. PATENT DOCUMENTS

| | | | | | |
|---|---|---|---|---|---|
| 5,402,488 | A | * | 3/1995 | Karlock | 380/204 |
| 5,508,749 | A | * | 4/1996 | Matsuo | 348/500 |
| 5,760,844 | A | * | 6/1998 | Jorden | 348/691 |
| 5,841,488 | A | * | 11/1998 | Rumreich | 348/694 |
| 5,953,069 | A | * | 9/1999 | Bruins et al. | 348/525 |
| 6,028,642 | A | * | 2/2000 | Rinaldi et al. | 348/540 |
| 6,046,776 | A | * | 4/2000 | Ngo et al. | 348/506 |
| 6,130,719 | A | * | 10/2000 | Hebbalalu et al. | 348/529 |
| 6,154,256 | A | * | 11/2000 | Bruins | 348/533 |
| 6,172,716 | B1 | * | 1/2001 | Karlock | 348/575 |
| 6,529,248 | B1 | * | 3/2003 | Tsyrganovich | 348/691 |
| 6,577,348 | B1 | * | 6/2003 | Park | 348/554 |
| 6,587,139 | B1 | * | 7/2003 | Hirao | 348/194 |
| 6,628,222 | B2 | * | 9/2003 | Go | 341/155 |
| 6,967,691 | B2 | * | 11/2005 | Keen | 348/695 |
| 6,977,692 | B2 | * | 12/2005 | Harvey | 348/525 |
| 7,106,387 | B2 | * | 9/2006 | Takimoto | 348/695 |
| 7,162,645 | B2 | * | 1/2007 | Iguchi et al. | 713/193 |
| 7,250,986 | B2 | * | 7/2007 | Miyajima | 348/691 |
| 2004/0027492 | A1 | * | 2/2004 | Keen | 348/691 |

\* cited by examiner

*Primary Examiner*—Brian P. Yenke
(74) *Attorney, Agent, or Firm*—Vedder, Price, Kaufman & Kammholz, P.C.

(57) ABSTRACT

A circuit and method for clamping a composite video component signal at the video black level by using horizontal synchronization timing information contained within the signal and clamping the signal during a time interval in which it is at the desired black level.

17 Claims, 3 Drawing Sheets

VIDEO SIGNAL CLAMP

BACKGROUND OF THE INVENTION

The present invention relates to clamp circuits, and in particular, clamp circuits for composite video signals containing synchronization components.

As is well-known, computer monitors and, increasingly, many higher quality televisions, receive their display signals in the form of component video signals such as GBR (green, blue, red), YPbPr (luminance, blue difference, red difference). Typically, the first of the three channels (e.g., the green and luminance signals) contains a composite signal in which both the video (green or luminance) and synchronization (horizontal and vertical) components are included. As is also well-known, the Consumer Electronics Association (CEA) standards (e.g., CEA-770.1-C, CEA-770.2-C and CEA-770.3-C) for component video signals specify the component video signal also containing the synchronization component to be a one-volt peak-to-peak signal, with the one extreme signal peak (e.g., minimum or lower) being that of the tip of the synchronization signal component and the opposite extreme signal peak (e.g., maximum or upper) being that of the maximum level, i.e., white, of the video signal component. For example, in conformance with the CEA-770.1-C standard, these voltage levels are −286 mV (mV) and +714 mV, respectively, while for the CEA-770.2-C and CEA-770.3-C standards, these levels are −300 mV and +700 mV, respectively. (For all three of these standards, the voltage levels for the other two component signals, Pb and Pr, are −350 mV and +350 mV.)

In order to operate successfully within the standards, it is necessary to accurately clamp the video signal so that its various signal components conform to these voltage ranges. One conventional technique for providing this clamping is to clamp the negative peak of the signal based on the synchronization signal tip. However, such a clamping technique is sensitive to noise, which can cause the negative peak to drift more positively or more negatively. Further, the height, or depth, of the synchronization signal tip is often not accurate due to the various signal channel characteristics, such as non-linear signal amplification.

SUMMARY OF THE INVENTION

In accordance with the presently claimed invention, a circuit and method for clamping a composite video component signal at the video black level uses horizontal synchronization timing information contained within the signal to clamp the signal during a time interval in which it is at the desired black level.

In accordance with one embodiment of the presently claimed invention, a video signal clamp includes an electrode, signal detection and generation circuitry, and clamp circuitry. The electrode is to convey an AC-coupled composite signal including first, second and third time intervals containing video, horizontal synchronization and composite synchronization components, respectively, wherein the composite synchronization component includes horizontal and vertical synchronization components. The signal detection and generation circuitry is coupled to the electrode and responsive to the AC-coupled composite signal by detecting the horizontal synchronization components and providing a control signal which corresponds to the horizontal synchronization components, is asserted during the second time interval and is de-asserted during the first and third time intervals. The clamp circuitry is coupled to the electrode and responsive to the control signal by clamping the electrode at a clamp voltage.

In accordance with another embodiment of the presently claimed invention, a video signal clamp includes electrode means, signal detector and generator means, and clamping means. The electrode means is for conveying an AC-coupled composite signal including first, second and third time intervals containing video, horizontal synchronization and composite synchronization components, respectively, wherein the composite synchronization component includes horizontal and vertical synchronization components. The signal detector and generator means is for responding to the AC-coupled composite signal by detecting the horizontal synchronization components and providing a control signal which corresponds to the horizontal synchronization components, is asserted during the second time interval and is de-asserted during the first and third time intervals. The clamping means is for responding to the control signal by clamping the electrode at a clamp voltage.

In accordance with another embodiment of the presently claimed invention, a method for clamping a video signal includes:

receiving an AC-coupled composite signal including first, second and third time intervals containing video, horizontal synchronization and composite synchronization components, respectively, wherein the composite synchronization component includes horizontal and vertical synchronization components;

detecting the horizontal synchronization components to generate a control signal which corresponds to the horizontal synchronization components, is asserted during the second time interval and is de-asserted during the first and third time intervals; and clamping the AC-coupled composite signal at a clamp voltage in response to the control signal.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Figure 1A:
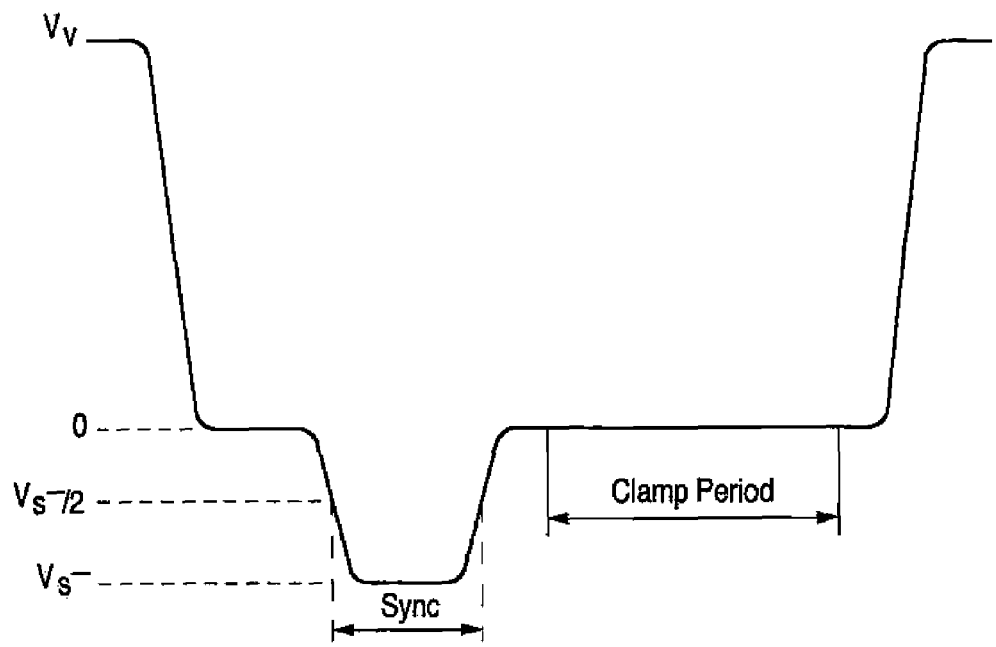
FIGS. 1A and 1B are signal timing diagrams of horizontal synchronization intervals for video signals with two-level and three-level synchronization signals, respectively.
Figure 1B:
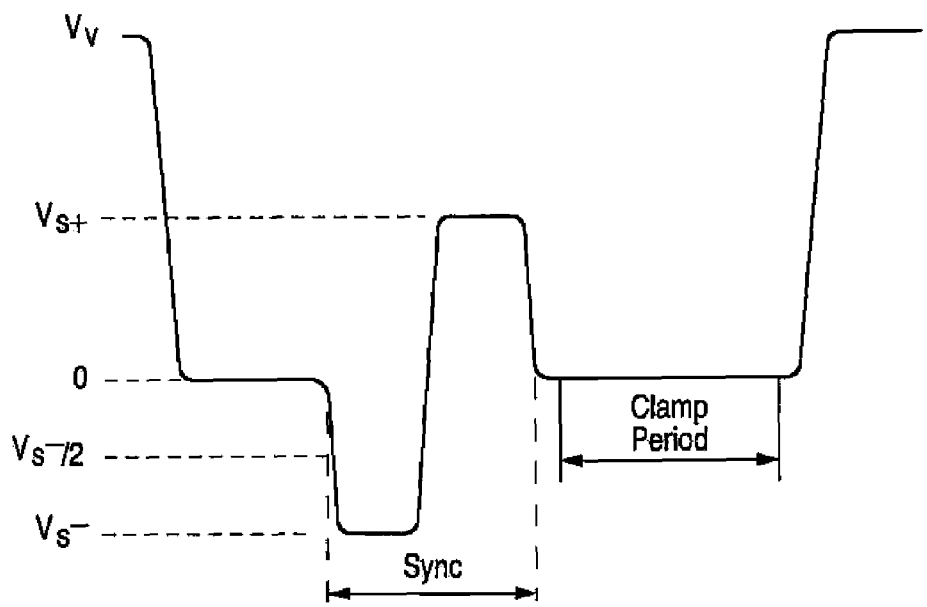

Referring to FIGS. 1A and 1B, a video signal clamp in accordance with the presently claimed invention detects the horizontal synchronization signal component by detecting the occurrence of the synchronization signal tip, and uses such detected signal to clamp the video signal during the clamp period. As is well-known, this clamp period, also known as the "back porch" of the horizontal synchronization signal interval, is at the video black level (typically zero volts) according to the applicable video signal standard. As is also well-known, the voltage levels of the lower Vs– and upper Vs+ synchronization tips are –286 and +286 mV for the CEA-770.1-C standard, and –300 and +300 mV for the CEA-770.2-C and CEA-770.3-C standards. By using the synchronization signal tip(s) to determine the timing for establishing the timing of the clamp period, such a video signal clamp can be used for clamping video signals according to multiple video signal standards.

Figure 2:
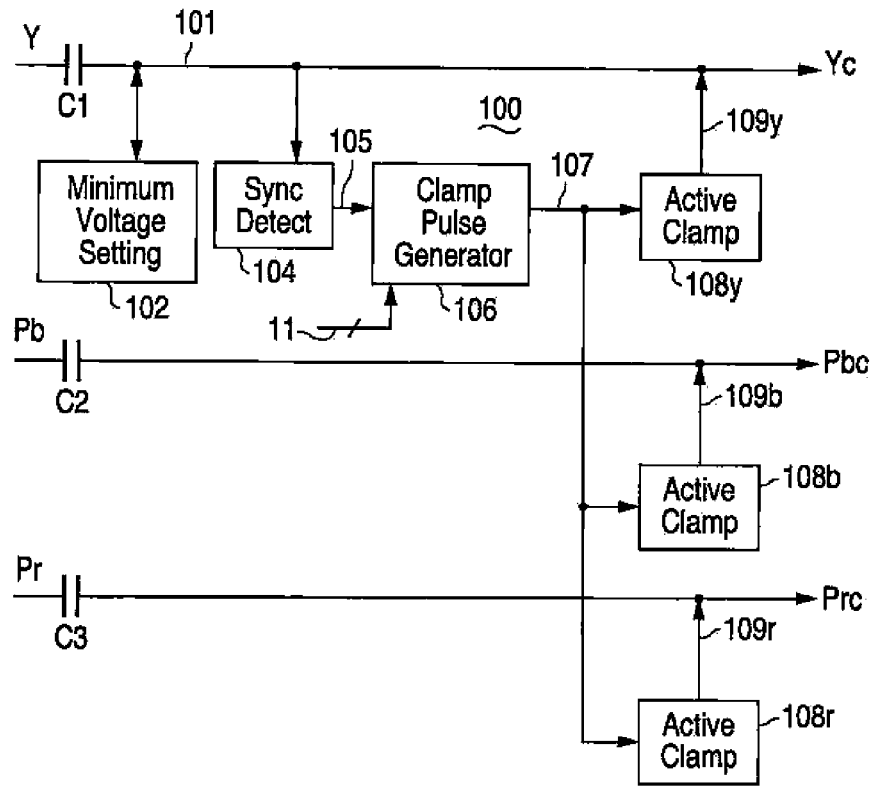
FIG. 2 is a functional block diagram of a video signal clamp in accordance with one embodiment of the presently claimed invention.

Referring to FIG. 2, a video signal clamp 100, in accordance with one embodiment of the presently claimed invention includes a minimum voltage setting stage 102, a synchronization detection stage 104, a clamp pulse generator stage 106, and an active clamp circuit 108y, all interconnected substantially, as shown. As discussed in more detail below, this circuit 100 uses the first component video signal Y to detect the occurrence of the horizontal synchronization signal tips to determine the proper timing for providing active voltage clamping of the AC-coupled component video signal Yc. Such active video signal clamping can be used for the other component video signals Pb, Pr with additional active clamp circuits 108b, 108r for providing appropriately timed video clamping voltages to the AC-coupled component video signals Pbc, Prc.

The first component video signal channel, e.g., the composite luminance signal Y, is AC-coupled via a capacitor C1 to provide an AC-coupled composite component signal Yc 101. The minimum voltage setting stage 102 monitors the voltage of this signal 101 and forces the negative peak of the video signal component to be maintained above the voltage level Vs– (FIGS. 1A and 1B) of the horizontal synchronization signal tip. The synchronization detection stage 104 detects the negative horizontal synchronization signal tips using a threshold of approximately one-half of the synchronization signal tip (Vs–/2). This stage 104 provides a detected signal 105 corresponding to the horizontal synchronization signal tip (discussed in more detail below) to the clamp pulse generator stage 106. This detected signal 105 is asserted when the horizontal synchronization signal tips are detected during those time intervals in which the vertical synchronization signal is not also active. In other words, as is well-known in the art, two synchronization signal intervals occur as part of a composite video signal. During the horizontal retrace interval, only the horizontal synchronization signal component is present, while during the vertical retrace interval, both horizontal and vertical synchronization signal components are present. For purposes of the presently claimed invention, the synchronization detection signal 105 is preferably asserted only during those intervals in which only the horizontal synchronization signal component is present.

The clamp pulse generator stage 106, in response to the detected synchronization signal 105, produces a clamp control signal 107, which causes the active clamp circuit 108y to provide an active clamping voltage 1109y to the AC-coupled component video signal Yc during the clamp period (FIGS. 1A and 1B). This active clamp voltage 1109y clamps the video signal Yc during the clamp period at the reference voltage, which is typically zero volts.

Accordingly, operation of this circuit 100 can be summarized as follows. Upon initial reception of the incoming video signal Y, the active clamp circuit 108y is disabled since there is no stable synchronization information yet. The minimum voltage setting stage 102 will establish the minimum voltage below that Vs– of the horizontal synchronization signal tip (e.g., –325 mV). For CEA-770.1-C operation, the video black level will initially be set to –39 mV, while for CEA-770.2-C and CEA-770.3-C operations, the video black level will initially be set to –25 mV. (These minimum voltage values are relative to the reference voltage which, as noted above, is typically zero volts.)

The synchronization detection stage now begins to operate, and begins detecting the horizontal synchronization signal tips. Following detection of the horizontal synchronization signal, the synchronization detection signal 105 initiates operation of the clamp pulse generator which, in turn, provides the clamp control signal 107 to the active clamp circuit 108y. The active clamp circuit 108y clamps the video black level during the clamp period to the reference voltage. As a result, the peak of horizontal synchronization signal tip will be set to the proper level (–286 mV for CEA-770.1-C and –300 mV for CEA-770.2-C and CEA-770.3-C). Since the minimum voltage, as established by the minimum voltage setting stage 102, is at –325 mV, the minimum voltage setting stage 102 will no longer have an effect on circuit operation following activation and operation of the active clamp circuit 108y as described.

As noted above, similar active clamp circuits 108b, 108r can be used to provide similar active clamping operations on the remaining AC-coupled component video signals Pbc, Prc.

Figure 3:
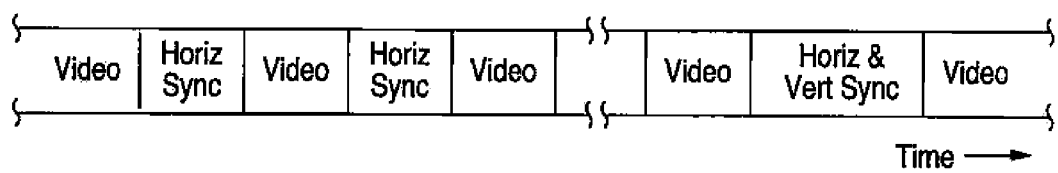
FIG. 3 illustrates the alternating nature of the video and synchronization signal components of a composite video signal.

Referring to FIG. 3, as discussed above, the detected synchronization signal 105 is preferably asserted only during those synchronization intervals in which only the horizontal synchronization information is present. During those time intervals in which both horizontal and vertical synchronization information are present, i.e., during the vertical retrace interval, the detected synchronization signal 105 is de-asserted, or otherwise inactive, so as to not cause the clamp pulse generator stage 106 to activate the active clamp circuit 108y during time intervals in which the video signal Yc is not at the video black level.

Figure 4A:
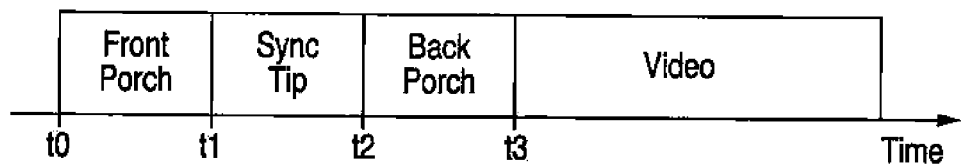
FIGS. 4A, 4B and 4C illustrate the timing relationships of the detected synchronization and clamp control signals of the circuitry of FIG. 2.
Figure 4B:
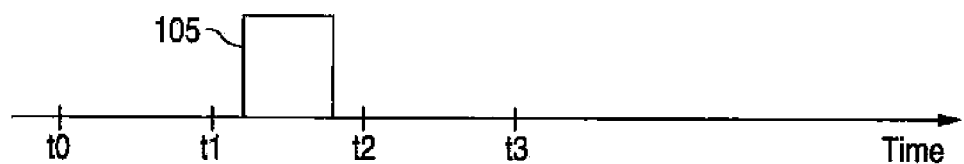
Figure 4C:
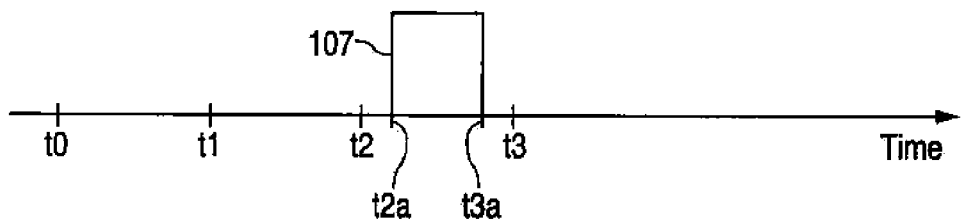

Referring to FIGS. 4A, 4B and 4C, the relative timing of the synchronization detection 105 and clamp control 107 signals can be better understood. As discussed above, the detected synchronization signal 105 is asserted following detection of the time interval in which the synchronization tip occurs. As shown, the front porch of the synchronization interval occurs during the time interval t0-t1. This is followed by the time interval t1-t2 during which the synchronization signal tip occurs. Following that is the back porch during time interval t2-t3, during which the clamping is performed. Accordingly, the detected synchronization signal 105 is asserted as desired within this time interval t1-t2. In response to this, the clamp pulse generator stage 106 generates the clamp control signal 107 within the clamp period T2-T3 with a control signal assertion duration t2a-t3a that can be determined in conformance with one or more control signals 11 (FIG. 2). Such control signal 11 can determine the appropriate delay interval t2-t2a and control signal 107 duration t2a-t3a for proper voltage clamping by the active clamp circuit 108y.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a video signal clamp, comprising:
    a first electrode to convey an AC-coupled composite signal including first, second and third time intervals containing video, horizontal synchronization and composite synchronization components, respectively, wherein said composite synchronization component includes horizontal and vertical synchronization components;
    signal detection and generation circuitry coupled to said first electrode and responsive to said AC-coupled composite signal by detecting said horizontal synchronization components and providing a control signal which corresponds to said horizontal synchronization components, is asserted during said second time interval and is de-asserted during said first and third time intervals; and
    first clamp circuitry coupled to said first electrode and said signal detection and generation circuitry, and responsive to said control signal by clamping said first electrode at a clamp voltage.

2. The apparatus of claim 1, wherein said signal detection and generation circuitry comprises:
    signal detection circuitry coupled to said first electrode and responsive to said AC-coupled composite signal by detecting said horizontal synchronization component and providing a detection signal corresponding to said horizontal synchronization components; and
    signal generation circuitry coupled to said signal detection circuitry and said first electrode, and responsive to said detection signal by providing said control signal.

3. The apparatus of claim 1, wherein said AC-coupled composite signal includes a black signal level substantially equal to said clamp voltage.

4. The apparatus of claim 1, wherein said control signal is asserted substantially only during a latter portion of said second time interval.

5. The apparatus of claim 1, wherein:
    said AC-coupled composite signal includes a black signal level substantially equal to said clamp voltage during said latter portion of said second time interval; and
    said control signal is active substantially only during a latter portion of said second time interval.

6. The apparatus of claim 1, further comprising:
    second and third electrodes to convey first and second AC-coupled color component signals;
    second clamp circuitry coupled to said second electrode and said signal detection and generation circuitry, and responsive to said active control signal by clamping said second electrode at said clamp voltage; and
    third clamp circuitry coupled to said third electrode and said signal detection and generation circuitry, and responsive to said active control signal by clamping said third electrode at said clamp voltage.

7. An apparatus including a video signal clamp, comprising:
    first electrode means for conveying an AC-coupled composite signal including first, second and third time intervals containing video, horizontal synchronization and composite synchronization components, respectively, wherein said composite synchronization component includes horizontal and vertical synchronization components;
    signal detector and generator means for responding to said AC-coupled composite signal by detecting said horizontal synchronization components and providing a control signal which corresponds to said horizontal synchronization components, is asserted during said second time interval and is de-asserted during said first and third time intervals; and
    first clamping means for responding to said control signal by clamping said first electrode at a clamp voltage.

8. The apparatus of claim 7, wherein said AC-coupled composite signal includes a black signal level substantially equal to said clamp voltage.

9. The apparatus of claim 7, wherein said control signal is asserted substantially only during a latter portion of said second time interval.

10. The apparatus of claim 7, wherein:
    said AC-coupled composite signal includes a black signal level substantially equal to said clamp voltage during said latter portion of said second time interval; and
    said control signal is active substantially only during a latter portion of said second time interval.

11. The apparatus of claim 7, further comprising:
    second and third electrode means for conveying first and second AC-coupled color component signals;
    second clamping means for responding to said active control signal by clamping said second electrode at said clamp voltage; and
    third clamping means for responding to said active control signal by clamping said third electrode at said clamp voltage.

12. A method for clamping a video signal, comprising:
    receiving an AC-coupled composite signal including first, second and third time intervals containing video, horizontal synchronization and composite synchronization components, respectively, wherein said composite synchronization component includes horizontal and vertical synchronization components;
    detecting said horizontal synchronization components to generate a control signal which corresponds to said horizontal synchronization components, is asserted during said second time interval and is de-asserted during said first and third time intervals; and
    clamping said AC-coupled composite signal at a clamp voltage in response to said control signal.

13. The method of claim 12, wherein said detecting said horizontal synchronization components to generate a control signal which corresponds to said horizontal synchronization components, is asserted during said second time interval and is de-asserted during said first and third time intervals comprises:
  detecting said horizontal synchronization components to generate a corresponding detection signal; and
  generating said control signal in response to said detection signal.

14. The method of claim 12, wherein said receiving an AC-coupled composite signal including first, second and third time intervals containing video, horizontal synchronization and composite synchronization components, respectively, comprises receiving an AC-coupled composite signal including a black signal level substantially equal to said clamp voltage.

15. The method of claim 12, wherein said detecting said horizontal synchronization components to generate a control signal which corresponds to said horizontal synchronization components, is asserted during said second time interval and is de-asserted during said first and third time intervals comprises asserting said control signal only during a latter portion of said second time interval.

16. The method of claim 12, wherein:
  said receiving an AC-coupled composite signal including first, second and third time intervals containing video, horizontal synchronization and composite synchronization components, respectively, comprises receiving an AC-coupled composite signal including a black signal level substantially equal to said clamp voltage; and said detecting said horizontal synchronization components to generate a control signal which corresponds to said horizontal synchronization components, is asserted during said second time interval and is de-asserted during said first and third time intervals comprises asserting said control signal only during a latter portion of said second time interval.

17. The method of claim 12, further comprising:

receiving first and second AC-coupled color component signals;

clamping said first AC-coupled color component signal in response to said control signal; and clamping said second AC-coupled color component signal in response to said control signal.

* * * * *

UNITED STATES PATENT AND TRADEMARK OFFICE
CERTIFICATE OF CORRECTION

PATENT NO. : 7,345,714 B2
APPLICATION NO. : 10/905634
DATED : March 18, 2008
INVENTOR(S) : Chen Page 1 of 1

It is certified that error appears in the above-identified patent and that said Letters Patent is hereby corrected as shown below:

On the title page,

[*] Notice: Subject to any disclaimer, the term of this patent is extended or adjusted under 35 USC 154(b) by 434 days Delete the phrase "by 434 days" and insert -- by 554 days --

Signed and Sealed this

Twenty-seventh Day of October, 2009

David J. Kappos
*Director of the United States Patent and Trademark Office*